(12) United States Patent
Eisler et al.

(10) Patent No.: US 12,479,708 B2
(45) Date of Patent: Nov. 25, 2025

(54) LIFT SYSTEM FOR CONTAMINANT MITIGATION

(71) Applicants: John A. Eisler, Ruskin, FL (US); Elwood A. Eisler, Cape Coral, FL (US); Charles Barber, Minerva, NY (US)

(72) Inventors: John A. Eisler, Ruskin, FL (US); Elwood A. Eisler, Cape Coral, FL (US); Charles Barber, Minerva, NY (US)

( * ) Notice: Subject to any disclaimer, the term of this patent is extended or adjusted under 35 U.S.C. 154(b) by 958 days.

(21) Appl. No.: 17/485,134

(22) Filed: Sep. 24, 2021

(65) Prior Publication Data
US 2022/0119237 A1    Apr. 21, 2022

Related U.S. Application Data

(60) Provisional application No. 63/083,041, filed on Sep. 24, 2020.

(51) Int. Cl.
*B66F 17/00* (2006.01)
*B01D 61/14* (2006.01)
*G05D 16/20* (2006.01)

(52) U.S. Cl.
CPC .......... *B66F 17/006* (2013.01); *B01D 61/145* (2013.01); *G05D 16/2066* (2013.01)

(58) Field of Classification Search
CPC ............ A61M 16/01; A61M 2209/082; A61M 16/0497; A61M 16/0875; A61M 2250/00; A61M 16/0003; A61G 13/101; A61D 11/00; A61D 3/00
See application file for complete search history.

(56) References Cited

U.S. PATENT DOCUMENTS

| | | | |
|---|---|---|---|
| 4,682,448 A | 7/1987 | Healey |
| 4,765,352 A | 8/1988 | Strieter |
| 5,312,297 A | 5/1994 | Dieckert et al. |
| 5,507,847 A | 4/1996 | George et al. |
| 6,383,242 B1 | 5/2002 | Rogers et al. |
| 6,390,112 B1 | 5/2002 | Christiansen |
| 7,188,636 B1 | 3/2007 | Kanne et al. |
| 7,406,978 B2 | 8/2008 | Mintie et al. |
| 2001/0045220 A1 | 11/2001 | Fara |
| 2007/0220846 A1 | 9/2007 | Ray |
| 2008/0157420 A1 | 7/2008 | Mayer |

(Continued)

FOREIGN PATENT DOCUMENTS

AU    723239 B2    8/2000

*Primary Examiner* — Amy J. Sterling
(74) *Attorney, Agent, or Firm* — Hodgson Russ LLP

(57) ABSTRACT

A contaminant mitigation system for a lift includes a set of vertical panels configured to be attached to a platform and guardrails of the lift to form a bottom enclosure and a set of vertical walls is arranged to slidingly correspond with the set of vertical panels. In this way, the set of vertical panels and the set of vertical walls cooperate to form a vertically-extendable enclosure. A controller is configured to extend and/or retract the vertically-extendable enclosure to engage a ceiling when the lift platform is positioned at the ceiling. An evacuator of the system is configured to maintain a negative pressure within the vertically-extendable enclosure when engaged with a ceiling.

28 Claims, 3 Drawing Sheets

(56) References Cited

U.S. PATENT DOCUMENTS

2016/0096714 A1    4/2016  Batchelor et al.
2019/0177143 A1*  6/2019  Hester .................... B66F 11/04
2021/0292147 A1*  9/2021  Mueller ................. B66F 11/04

* cited by examiner

LIFT SYSTEM FOR CONTAMINANT MITIGATION

CROSS-REFERENCE TO RELATED APPLICATIONS

This application claims priority to U.S. Provisional Application No. 63/083,041, filed on Sep. 24, 2020, the disclosure of which is incorporated herein by reference.

FIELD OF THE DISCLOSURE

The present disclosure relates to man lifts used for work within ceiling environments.

BACKGROUND OF THE DISCLOSURE

Ceiling environments, such as the volume of space above a drop ceiling, are used to contain and hide mechanical systems (for example, plumbing components, HVAC components, electrical systems, etc.) Such environments are often replete with contaminants such as dust since the above-ceiling space is not routinely accessed for cleaning. In healthcare facilities, such as hospitals, such above-ceiling environments can contain pathogens. When these spaces are accessed for maintenance, there is a chance that the ambient space below the ceiling may be contaminated. This can also expose personnel in the ambient environment to the contaminants contained above the ceiling. For this reason, once maintenance is completed within a ceiling, the room may require a thorough cleaning, disinfection, and/or sanitization to remove the contaminants. For this reason, there is a long-felt need for a system to mitigate the contamination of the ambient space while a ceiling space is accessed.

BRIEF SUMMARY OF THE DISCLOSURE

The present disclosure may be embodied as a contaminant mitigation system for a lift. The system includes a set of vertical panels configured to be attached to a platform and guardrails of the lift to form a bottom enclosure. A set of vertical walls is arranged to slidingly correspond with the set of vertical panels. In this way, the set of vertical panels and the set of vertical walls cooperate to form a vertically-extendable enclosure. In some embodiments, the vertically-extendable enclosure is sized to engage with a drop ceiling portion surrounding a panel of a drop ceiling. A controller is configured to extend and/or retract the vertically-extendable enclosure to engage a ceiling when the lift platform is positioned at the ceiling. The controller may be configured such that when a ceiling is engaged, the vertically-extendable enclosure is retracted as the platform is raised closer to a level of the ceiling. The system may include one or more light sources, each configured to project light onto a ceiling to aid in positioning the lift. In some embodiments, the one or more light sources are lasers.

An evacuator of the system is configured to maintain a negative pressure within the vertically-extendable enclosure when engaged with a ceiling. The evacuator may include one or more vacuum systems. Each vacuum system of the one or more vacuum systems may be configured for ultrafiltration. Each vacuum system may be configured to capture particles in a self-contained filter for removal from the vacuum system and disposal without ambient contamination. In some embodiments, the controller is configured to control the evacuator so as to maintain a pre-determined negative pressure.

A vertical panel of the set of vertical panels may be a door panel configured to be attached to a hinged door of the lift. A vertical wall of the set of vertical walls corresponding to such a door panel may be a flexible sheet and configured to retract on a roller as the vertically-extendable enclosure is retracted. The roller may be spring-biased to retract the flexible sheet. In some embodiments, the door panel includes two (or more) subpanels to attach to a double-door of the lift.

The controller may be configured to receive a contact signal when the vertically-extendable enclosure contacts a ceiling. For example, the contact signal may include a contact force (i.e., a signal value representing the magnitude of contact force), and the controller may be configured to extend and/or retract the vertically-extendable enclosure to maintain a substantially constant contact force.

In another aspect, the present disclosure may be embodied as a man lift having a contaminant mitigation system. The man lift includes a platform capable of being raised or lowered and a set of guardrails affixed to a circumference of the platform. A set of vertical panels is attached to the platform and guardrails of the lift to form a bottom enclosure. A set of vertical walls is arranged to slidingly correspond with the set of vertical panels. In this way, the set of vertical panels and the set of vertical walls cooperate to form a vertically-extendable enclosure. In some embodiments, the vertically-extendable enclosure is sized to engage with a drop ceiling portion surrounding a panel of a drop ceiling. A controller is configured to extend and/or retract the vertically-extendable enclosure to engage a ceiling when the lift platform is positioned at the ceiling. The controller may be configured such that when a ceiling is engaged, the vertically-extendable enclosure is retracted as the platform is raised closer to a level of the ceiling. The system may include one or more light sources, each configured to project light onto a ceiling to aid in positioning the lift. In some embodiments, the one or more light sources are lasers.

An evacuator of the man lift is configured to maintain a negative pressure within the vertically-extendable enclosure when engaged with a ceiling. The evacuator may include one or more vacuum systems. Each vacuum system of the one or more vacuum systems may be configured for ultrafiltration. Each vacuum system may be configured to capture particles in a self-contained filter for removal from the vacuum system and disposal without ambient contamination. In some embodiments, the controller is configured to control the evacuator so as to maintain a pre-determined negative pressure.

A vertical panel of the set of vertical panels may be a door panel configured to be attached to a hinged door of the lift. A vertical wall of the set of vertical walls corresponding to such a door panel may be a flexible sheet and configured to retract on a roller as the vertically-extendable enclosure is retracted. The roller may be spring-biased to retract the flexible sheet. In some embodiments, the door panel includes two (or more) subpanels to attach to a double-door of the lift.

The controller may be configured to receive a contact signal when the vertically-extendable enclosure contacts a ceiling. For example, the contact signal may include a contact force (i.e., a signal value representing the magnitude of contact force), and the controller may be configured to extend and/or retract the vertically-extendable enclosure to maintain a substantially constant contact force.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
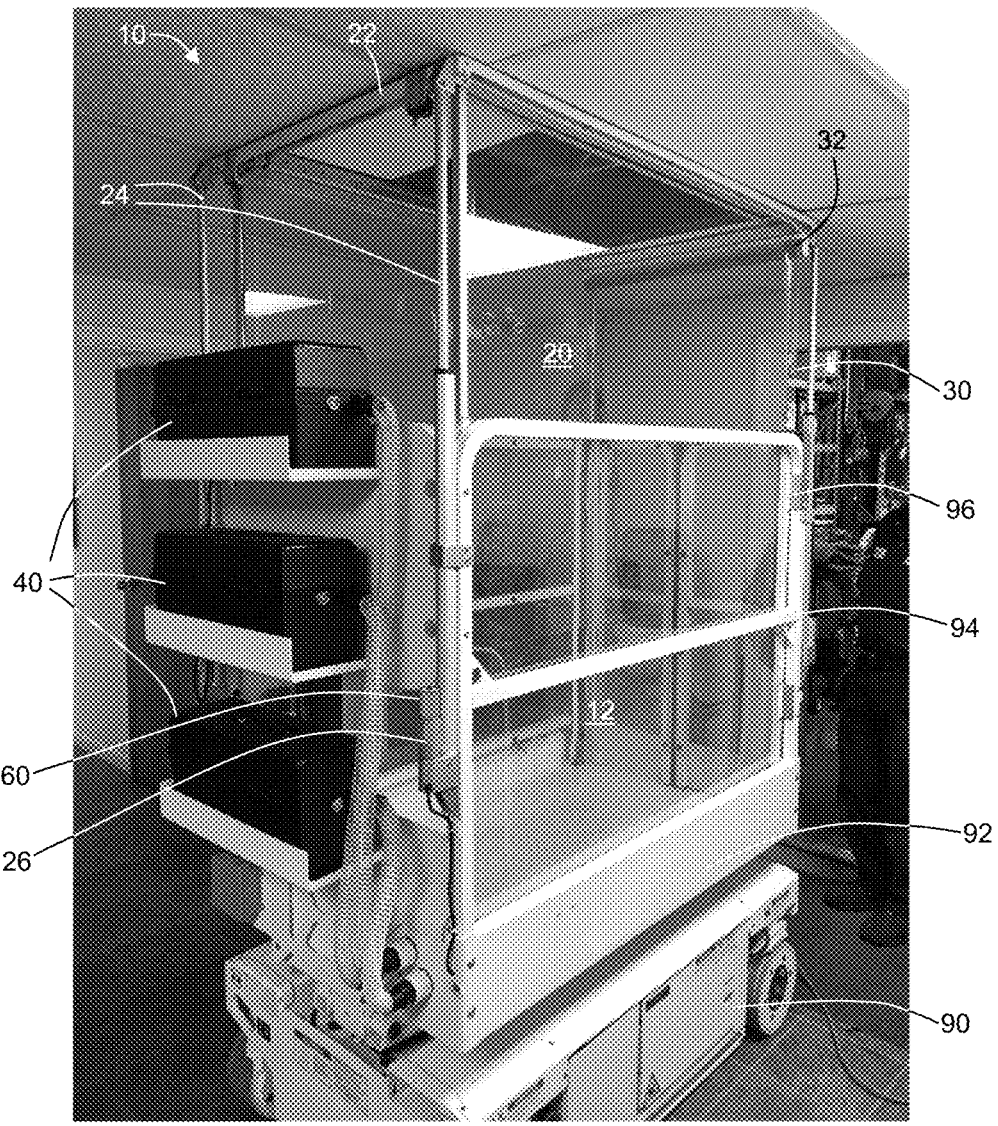
FIG. 1 depicts a system according to an embodiment of the present disclosure and showing the system configured on a scissor lift.

Embodiments of the presently-disclosed system are designed to allow personnel to work safely in ceiling areas such as, for example, drop ceilings of health care facilities, and to minimize exposure to contaminants (e.g., pathogens, etc.) of the ambient environment and personnel. The system accomplishes this by establishing a containment volume with negative pressure that funnels dust and debris into a series of vacuums. The vacuums may be capable of filtering particles down to 0.12 microns. In some embodiments, the system is configured to be mounted to a man lift.

In a first aspect, the present disclosure may be embodied as a contaminant mitigation system 10 for a lift 90. The system 10 comprises a set of vertical panels 12 that are configured to be attached to a platform 92 of the lift (where the platform may be a portion of the lift on which one or more people may stand). For example, the set of vertical panels 12 can be configured to attached to a circumference of the platform. Attachment may be directly to the platform or indirectly (e.g, having one or more components between a vertical wall and the platform). It will be apparent to one having skill in the art, that such lifts may include guardrails 94 attached to a circumference of the platform for the safety of a person standing on the platform. The set of vertical panels 12 may be configured to attach to the platform and/or the guardrails (i.e., attach to the platform by way of attachment to the guardrails). For example, each panel of the set of panels may be attached to an inside of a corresponding guardrail. Where two panels meet, for example, at a corner, the panels may have a gap or may be joined to be at least partially sealed. The panels may be sealed by use of adhesive, mechanical joining, welding, adhesive tape, gap-filling material, gaskets, or any other suitable technique or techniques for connecting the panels such that air cannot pass through the seal. In some embodiments, one or more panels of the set of vertical panels may be made from a clear material such as, for example, poly(methyl methacrylate) ("PMMA"). In some embodiments, one or more of the panels may be tinted, translucent, opaque, or otherwise configured to be less than transparent. One or more of the panels may be rigid.

The guardrail of the lift may include a hinged door 96 on a side of the platform 92. In such embodiments, a panel of the set of vertical panels is configured to be attached to the hinged door. In this way, an operator can enter the platform of the lift by way of the door, and once the door is closed, the platform is enclosed by the bottom enclosure. Such a panel of the set of vertical panels may be referred to herein as a "door panel." In some embodiments, such as that depicted in FIG. 1, the door may be configured as double doors (i.e., two doors configured to cooperate to form a larger opening). As such, the door panel may comprise two subpanels, each subpanel being configured to attach to a corresponding door of the double doors of the lift.

The system 10 further comprises a set of vertical walls 20. The set of vertical walls 20 is arranged to slidingly correspond to the set of vertical panels 12. For example, each vertical wall of the set of vertical walls may be in sliding relation to a corresponding vertical panel of the set of vertical panels. In other words, a vertical wall is configured to slide on or adjacent to its corresponding vertical panel. In other embodiments, the vertical walls and vertical panels may not be in a one-to-one relationship with each other. The set of vertical panels 12 and the set of vertical walls 20 cooperate to form a vertically-extendable enclosure. The set of vertical walls may be disposed on interior surfaces of the set of vertical panels. FIG. 1 shows an embodiment where the set of vertical walls is attached to an upper frame member 22. The upper frame member 22 of this embodiment is raised or lowered by drive rods 24 located at each corner of the assembly. The drive rods may be pistons, screws, pneumatic drives, hydraulic drives, etc. The drive rods 24 are moved using actuators 26. The actuators may be electric motors (e.g., stepper motors, brushed motors, brushless DC motors, etc.), pneumatic pumps, hydraulic pumps, etc. In the depicted embodiment, drive rods and actuators are depicted at each corner of the enclosure, but other configurations are possible. The system may include additional drive rods and/or actuators or fewer of each. In some embodiments, the system may include alternatives to drive rods and/or actuators to effectuate the raising or lowering of the vertical walls.

Figure 2A:
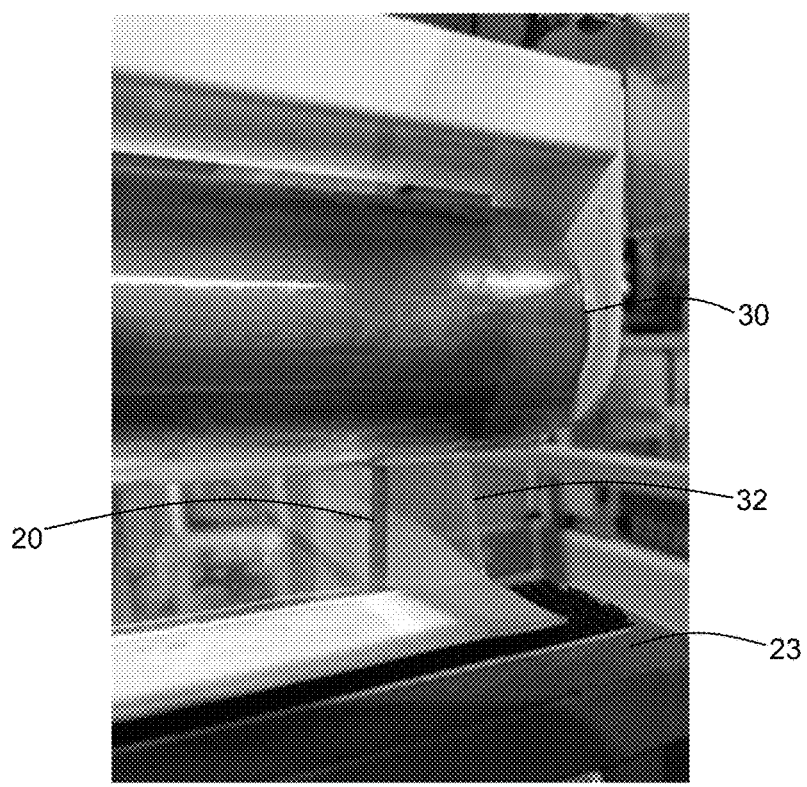
FIG. 2A is a detail view of a flexible sheet and roller configuration.
Figure 2B:
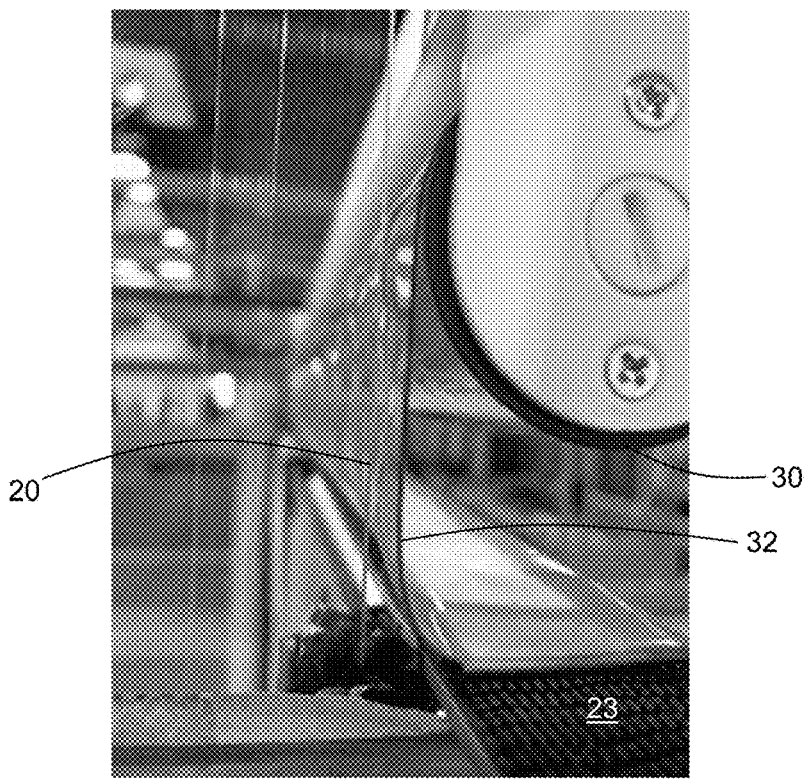
FIG. 2B is another detail view of the flexible sheet and roller of FIG. 2A.
Figure 3:
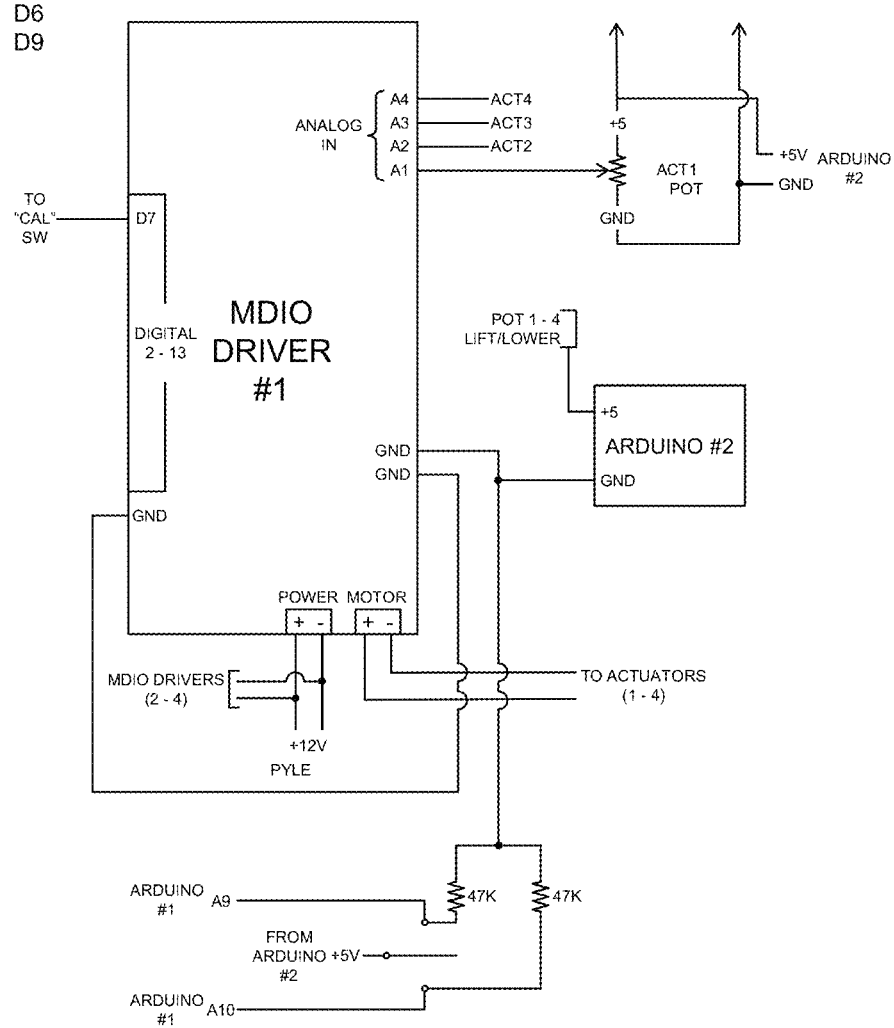
FIG. 3 is a schematic diagram of a portion of an exemplary controller for a system according to the present disclosure.

Not every vertical panel of the set of vertical panels may have a corresponding vertical wall. In some embodiments, such as where a door is present on the lift, an upper portion of the system may include a flexible sheet 30 configured to retract to or extend from a roller 32 as the vertically-extendable enclosure is lowered or raised, respectively. The flexible sheet 30 may be considered a vertical wall of the set of vertical walls. The roller 32 may be spring biased to retract the flexible sheet 30. The flexible sheet 30 may be attached to a fixed rail 23 of the guardrail above the door (see also FIGS. 2A and 2B). For example, the flexible sheet 30 may be affixed to the fixed rail 23 using a fastener such as a hook-and-loop fastener, snap connectors, etc. The flexible sheet 30 is advantageously arranged close to an edge of each adjacent vertical wall 20 so as to reduce and/or minimize a gap between the flexible sheet 32 and the adjacent vertical walls 20.

A controller of the system 10 is configured to extend and/or retract the vertically-extendable enclosure to engage a ceiling when the lift platform is positioned at the ceiling. For example, the controller may be in operable communication with actuators 26 to extend the enclosure until a top of the enclosure engages the ceiling. The controller may receive a contact signal when the vertically-extendable enclosure contacts the ceiling. For example, the system may include one or more microswitches that provide the contact signal when the contact with the ceiling is made. In some embodiments, the contact signal comprises a contact force (e.g., a signal value representing a force of contact) which is based on the force of the contact between the enclosure and the ceiling. In such embodiments, the controller may be configured to extend and/or retract the vertically-extendable enclosure so as to maintain a substantially constant contact force. A portion of an exemplary controller is depicted in FIG. 4.

The system 10 further includes an evacuator 40 configured to maintain a negative pressure (i.e., relative to ambient) within the vertically-extendable enclosure when engaged with a ceiling. The evacuator 40 may be sized to overcome gaps in the enclosure and/or the ceiling area such that a sufficient negative pressure can be maintained to prevent contaminants from exiting the enclosure into the ambient environment. For this reason, it may be beneficial to minimize gaps in the vertically-extendable enclosure. In some embodiments, such as that depicted in FIG. 1, the evacuator includes one or more vacuum systems. The vacuum system(s) may be configured for ultra-filtration (e.g., filtration of particles as small as 0.12 microns in diameter). The vacuum system(s) may be configured to capture filtered particles in a self-contained filter (e.g., a filter within a sealable canister) for removal from the vacuum system(s). In this way, the filtered particles may be removed and disposed of without contaminating the ambient environment. In some embodiments, the controller of the system may be configured to control the evacuator so as to maintain a pre-determined negative pressure within the enclosure. In some embodiments, the evacuator may include a vacuum hose that is accessible by the operator within the enclosure. Such a vacuum hose may be used to remove contaminants from the enclosure before the operator opens the doors to exit the system.

The system may be sized to engage with a portion of a drop-ceiling surrounding a tile of the drop ceiling. For example, the tiles of the ceiling may be 24"×48" and the top of the enclosure may be slightly larger (e.g., 28"×52") so that the enclosure may be engaged with the ceiling surrounding a tile in the ceiling (see FIG. 1). In operation, the operator positions the platform directly under the ceiling tile they wish to remove. The platform may be positioned with the aid of a positioning system using one or more light sources 60—e.g., lasers (further described below). The operator then raises the containment enclosure (vertically-extendable enclosure) to an operating height where it is in contact with the ceiling. He/she then removes the tile—preferably by pushing it up and sliding it out of the way—and then proceeds to perform whatever maintenance or repairs are required.

The platform of the lift may be raised a limited amount (for example, limited by the height of the guardrails and enclosure frame) with the tile removed to allow the operator additional access within the ceiling space. The system is designed to allow the operator to raise the platform while the enclosure is in contact with the ceiling when/if he/she requires further entry into the space above the tiles. This may be accomplished using sensors that monitor the contact force against the ceiling. As the contact force exceeds a pre-determined amount, the enclosure system lowers until desired ceiling contact force is restored. In some embodiments, the controller may have a user operable control to adjust the desired contact force.

Once the work is completed, the operator lowers the platform and replaces the tile. The system may be configured such that the operator is able to lower the platform while the enclosure is in contact with the ceiling when/if he exits the space above the tiles. This may be accomplished using sensors that monitor the contact force against the ceiling. As the contact force drops below a pre-determined amount, the enclosure system raises until desired ceiling contact force is restored. The operator then engages the vacuum system creating negative pressure within the containment enclosure and exchanges the air within the enclosure until the air quality is restored to safe levels. He may then pick up the handheld vacuum and cleans/removes any debris they may have landed on the floor or other surfaces within the enclosure. He/she then lowers the containment enclosure and moves on to the next repair location.

The aforementioned guidance system may use one or more light sources, such as, for example, lasers, to help the operator in positioning the platform. For example, a single laser device may be positioned in a corner, on a side, or in the center of the platform, or in any other location of the platform, and oriented to project light onto the ceiling. In another example, two light sources may be located at opposite corners of the platform to project light onto the ceiling. In yet another example, four light sources may be arranged with one of the light sources at each corner of the platform to project light onto the ceiling. In this way, the operator may more easily visualize the location of the ceiling under which the platform is positioned. In some embodiments, the light sources may be configured to project shaped light onto the ceiling—for example, a line of light, a crosshair pattern, etc. Non-limiting examples of suitable light sources include low-power (e.g., <1 mW) class 2 lasers, such as a red or green diode laser.

The vacuum canisters are self-contained, so once they are full, the operator removes them from the vacuum and seals a vacuum input of the canister. The canister is then taken to an area for disposal of the containment material.

In another aspect, the present disclosure may be embodied as a man lift having a contaminant mitigation system. The contaminant mitigation system may be any of the systems 10 described herein. The man lift may be any lift configuration suitable for use in such ceiling maintenance operations. For example, the lift may be a scissor-type lift having a platform located on scissor lift members configured to raise and/or lower the platform. In other embodiments, the man lift may be an extendable boom lift, an articulating boom lift, or any other type of man lift.

Although the present disclosure has been described with respect to one or more particular embodiments, it will be understood that other embodiments of the present disclosure may be made without departing from the spirit and scope of the present disclosure.

What is claimed is:

1. A contaminant mitigation system for a lift, comprising:
   a set of vertical panels configured to be attached to a platform and guardrails of the lift to form a bottom enclosure;
   a set of vertical walls arranged to slidingly correspond with the set of vertical panels such that the set of vertical panels and the set of vertical walls cooperate to form a vertically-extendable enclosure;
   a controller configured to extend and/or retract the vertically-extendable enclosure to engage a ceiling when the lift platform is positioned at the ceiling; and
   an evacuator configured to maintain a negative pressure within the vertically-extendable enclosure when engaged with a ceiling.

2. The system of claim 1, wherein a vertical panel of the set of vertical panels is a door panel configured to be attached to a hinged door of the lift.

3. The system of claim 2, wherein a vertical wall of the set of vertical walls corresponding to the door panel is a flexible sheet and configured to retract on a roller as the vertically-extendable enclosure is retracted.

4. The system of claim 3, wherein the roller is spring-biased to retract the flexible sheet.

5. The system of claim 2, wherein the door panel comprises two subpanels configured to attach to a double-door of the lift.

6. The system of claim 1, wherein the controller is configured to receive a contact signal when the vertically-extendable enclosure contacts a ceiling.

7. The system of claim 6, wherein the contact signal comprises a contact force and the controller is configured to extend and/or retract the vertically-extendable enclosure to maintain a substantially constant contact force.

8. The system of claim 1, wherein the evacuator comprises one or more vacuums systems.

9. The system of claim 8, wherein each vacuum system is configured for ultra-filtration.

10. The system of claim 8, wherein each vacuum system is configured to capture particles in a self-contained filter for removal from the vacuum system and disposal without ambient contamination.

11. The system of claim 1, wherein the controller is configured to control the evacuator so as to maintain a pre-determined negative pressure.

12. The system of claim 1, wherein the vertically-extendable enclosure is sized to engage with a drop ceiling portion surrounding a panel of a drop ceiling.

13. The system of claim 1, wherein the controller is configured such that when a ceiling is engaged, the vertically-extendable enclosure is retracted as the platform is raised closer to a level of the ceiling.

14. The system of claim 1, further comprising one or more light sources, each configured to project light onto a ceiling to aid in positioning the lift.

15. A man lift having a contaminant mitigation system, comprising:
 a platform capable of being raised or lowered;
 a set of guardrails affixed to a circumference of the platform;
 a set of vertical panels attached to the platform and guardrails of the lift to form a bottom enclosure;
 a set of vertical walls arranged to slidingly correspond with the set of vertical panels such that the set of vertical panels and the set of vertical walls cooperate to form a vertically-extendable enclosure;
 a controller configured to extend and/or retract the vertically-extendable enclosure to engage a ceiling when the lift is extended to a ceiling; and
 an evacuator configured to maintain a negative pressure (relative to ambient) within the vertically-extendable enclosure when engaged with a ceiling.

16. The man lift of claim 15, wherein a guardrail of the set of guard rails comprises a hinged door and a vertical panel of the set of vertical panels is a door panel attached to the hinged door.

17. The man lift of claim 16, wherein a vertical wall of the set of vertical walls corresponding to the door panel is a flexible sheet and configured to retract on a roller as the vertically-extendable enclosure is retracted.

18. The man lift of claim 16, wherein the door panel comprises two subpanels configured to attach to a double-door of the lift.

19. The man lift of claim 15, wherein the controller is configured to receive a contact signal when the vertically-extendable enclosure contacts a ceiling.

20. The man lift of claim 19, wherein the contact signal comprises a contact force and the controller is configured to extend and/or retract the vertically-extendable enclosure to maintain a substantially constant contact force.

21. The man lift of claim 20, wherein the evacuator comprises one or more vacuums systems.

22. The man lift of claim 21, wherein each vacuum system is configured for ultra-filtration.

23. The man lift of claim 21, wherein each vacuum system is configured to capture particles in a self-contained filter for removal from the vacuum system and disposed without ambient contamination system.

24. The man lift of claim 15, wherein the controller is configured to control the evacuator so as to maintain a pre-determined negative pressure.

25. The man lift of claim 15, wherein the vertically-extendable enclosure is sized to engage with a drop ceiling portion surrounding a panel of a drop ceiling.

26. The man lift of claim 15, wherein the controller is configured such that a ceiling is engaged, the vertically-extendable enclosure is retracted as the platform is raised closer to a level of the ceiling.

27. The man lift of claim 15, further comprising scissor lift members configured to raise and/or lower the platform.

28. The man lift of claim 15, further comprising one or more light sources, each configured to project light onto a ceiling to aid in positioning the lift.

* * * * *